United States Patent
Wijnands (10) Patent No.: US 8,638,787 B2
(45) Date of Patent: Jan. 28, 2014

(54) MULTICAST HELLO ON DEMAND

(75) Inventor: IJsbrand Wijnands, Leuven (BE)

(73) Assignee: Cisco Technology, Inc., San Jose, CA (US)

( * ) Notice: Subject to any disclaimer, the term of this patent is extended or adjusted under 35 U.S.C. 154(b) by 703 days.

(21) Appl. No.: 12/783,922

(22) Filed: May 20, 2010

(65) Prior Publication Data

US 2011/0286450 A1    Nov. 24, 2011

(51) Int. Cl.
*H04L 12/28* (2006.01)

(52) U.S. Cl.
USPC .......................................... 370/390; 710/316

(58) Field of Classification Search
USPC .................................. 370/390, 432
See application file for complete search history.

(56) References Cited

U.S. PATENT DOCUMENTS

| | | | |
|---|---|---|---|
| 6,298,061 B1 | 10/2001 | Chin et al. | |
| 6,839,348 B2 | 1/2005 | Tang et al. | |
| 6,847,638 B1 | 1/2005 | Wu et al. | |
| 7,117,273 B1 | 10/2006 | O'Toole et al. | |
| 7,385,977 B2 | 6/2008 | Wu et al. | |
| 7,515,535 B2 | 4/2009 | Finn | |
| 7,546,380 B2 | 6/2009 | Kouvelas et al. | |
| 7,554,959 B1 | 6/2009 | Dowling | |
| 7,573,888 B2 | 8/2009 | Previdi et al. | |
| 7,646,739 B2 | 1/2010 | Previdi et al. | |
| 2002/0097718 A1* | 7/2002 | Korus et al. ................... | 370/390 |
| 2005/0157741 A1* | 7/2005 | Wu et al. ....................... | 370/432 |
| 2007/0030817 A1* | 2/2007 | Arunachalam et al. ....... | 370/390 |
| 2007/0153790 A1* | 7/2007 | Boers et al. ................... | 370/390 |
| 2007/0214359 A1 | 9/2007 | Williamson | |
| 2009/0037607 A1 | 2/2009 | Farinacci et al. | |
| 2009/0207840 A1* | 8/2009 | McCanne ..................... | 370/390 |

* cited by examiner

*Primary Examiner* — Robert Wilson
*Assistant Examiner* — Lionel Preval
(74) *Attorney, Agent, or Firm* — Novak Druce Connolly Bove + Quigg LLP (57) ABSTRACT

In one embodiment, a particular multicast-enabled device on a LAN may determine that it is to send a Join message to an upstream multicast-enabled device that is configured to source multicast data into the LAN. As such, the particular device may transmit a Join message to the upstream device, where the Join message may have a Hello Request indication when there are no downstream multicast neighbors for the upstream device in the LAN, or may not have the Hello Request indication if there is at least one downstream multicast neighbor for the upstream device. Specifically, the Hello Request requests that the upstream device transmit Hello messages onto the LAN. Multicast-enabled devices in the LAN may thus transmit Hello messages in response to receiving a Join message having a Hello Request directed to that particular device, that is, transmitting the Hello messages so long as there is interest in receiving them.

25 Claims, 9 Drawing Sheets

MULTICAST HELLO ON DEMAND

TECHNICAL FIELD

The present disclosure relates generally to computer networks, and, more particularly, to multicast protocol messages (e.g., protocol independent multicast or "PIM" messages).

BACKGROUND

In a multicast environment, such as a multicast virtual private network (MVPN), protocol independent multicast (PIM) may be executed over a virtual local area network (LAN), such as a multicast distribution tree or "MDT," that connects all the provider edge devices (PEs) participating in the multicast environment. The number of devices that participate in PIM is generally equal to the number of PEs that are enabled for multicast in that multicast environment, which in large multicast deployments may reach 1000 PEs per VPN.

PIM typically executes over a virtual LANs such that each device/node enabled for PIM sends out periodic PIM "Hello" messages to announce itself as multicast capable, often including a listing of supported attributes. If, for example, an MVPN has 1000 multicast enabled devices (e.g., PEs), each device will generally have a PIM neighbor list of 999 entries. Since PIM Hello messages may be transmitted by each device once every thirty seconds, the PIM neighbor list is refreshed by receiving approximately 33 Hello messages per second (999 entries/30 seconds). Notably, in the event a PIM device is connected to multiple large MVPNs, this load is going to be even higher. While this may not be a concern for systems capable of handling the instances of such large multicast deployments with high numbers of PEs (which are rare in today's networks), scalability of PIM may still remain a concern for certain customers.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a particular multicast-enabled device on a local area network (LAN) in a computer network may determine that it is to send a Join message to an upstream multicast-enabled device that is configured to source multicast data into the LAN. As such, the particular device may transmit a Join message to the upstream device on the LAN, where the Join message may have a Hello Request indication when there are no downstream multicast neighbors for the upstream device in the LAN, or may not have the Hello Request indication if there is at least one downstream multicast neighbor for the upstream device in the LAN. Specifically, the Hello Request requests that the upstream device transmit Hello messages onto the LAN. Multicast-enabled devices in the LAN may thus transmit Hello messages in response to receiving a Join message having a Hello Request indication directed to that particular device, that is, transmitting the Hello messages so long as there is interest in receiving them.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 1:
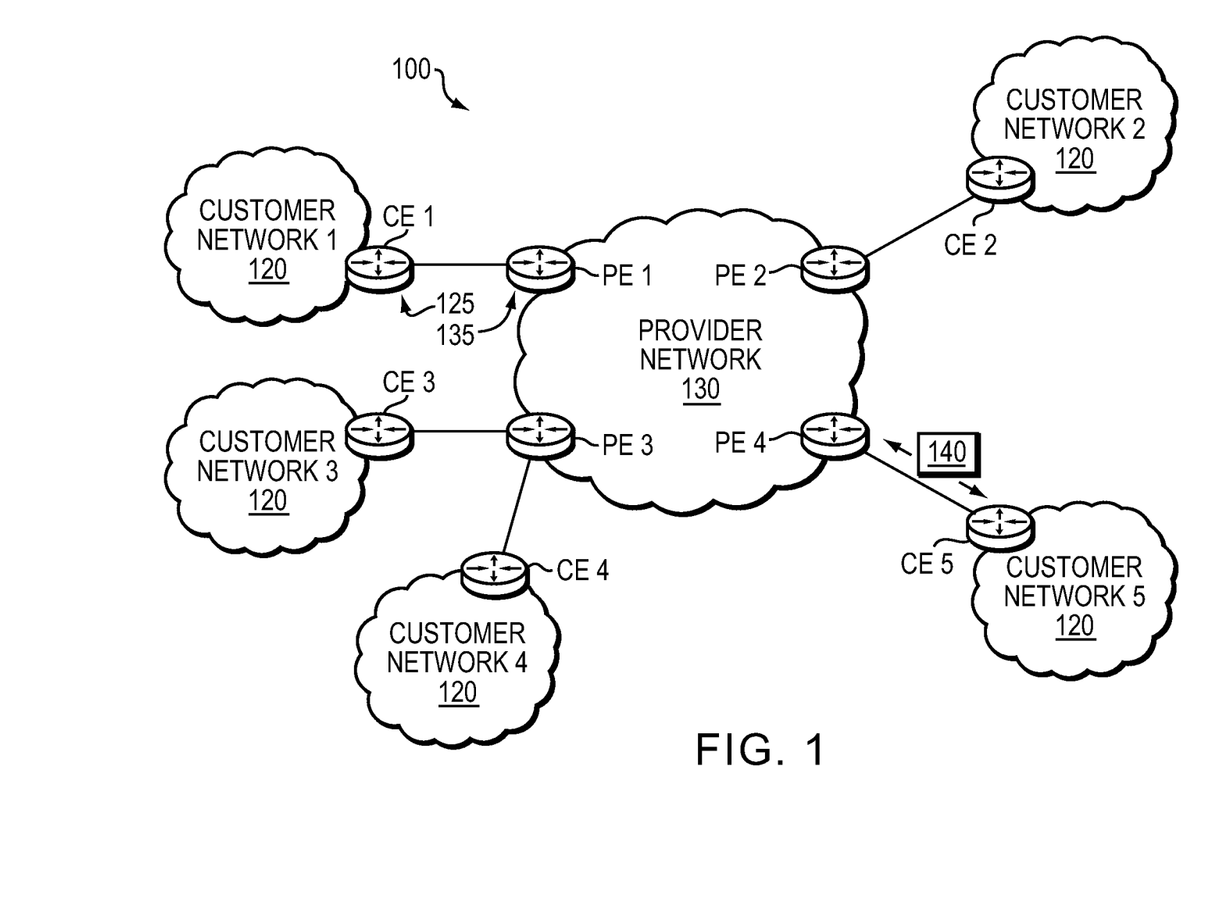
FIG. 1 illustrates an example computer network.

FIG. 1 is a schematic block diagram of an example computer network 100 illustratively comprising nodes/devices, such as one or more routers interconnecting associated networks/domains as shown. Illustratively, in a typical service provider network, customer networks 120 (e.g., 1-5) may be interconnected by a centralized or "core" provider network 130. In particular, customer edge routers/devices 125 (e.g., "CEs" 1-5) of a corresponding customer network 120 may interconnect with a corresponding provider edge router/device 135 (e.g., "PEs" 1-4) of the provider network 130 in order to provide connectivity and communication between the customer networks. Those skilled in the art will understand that any number of nodes, devices, links, etc. may be used in the computer network, and that the view shown herein is for simplicity. Those skilled in the art will also understand that while the embodiments described herein is described generally, it may apply to any network configuration within an Autonomous System (AS) or area, or throughout multiple ASes or areas, etc.

Data packets 140 (e.g., traffic, messages, etc.) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
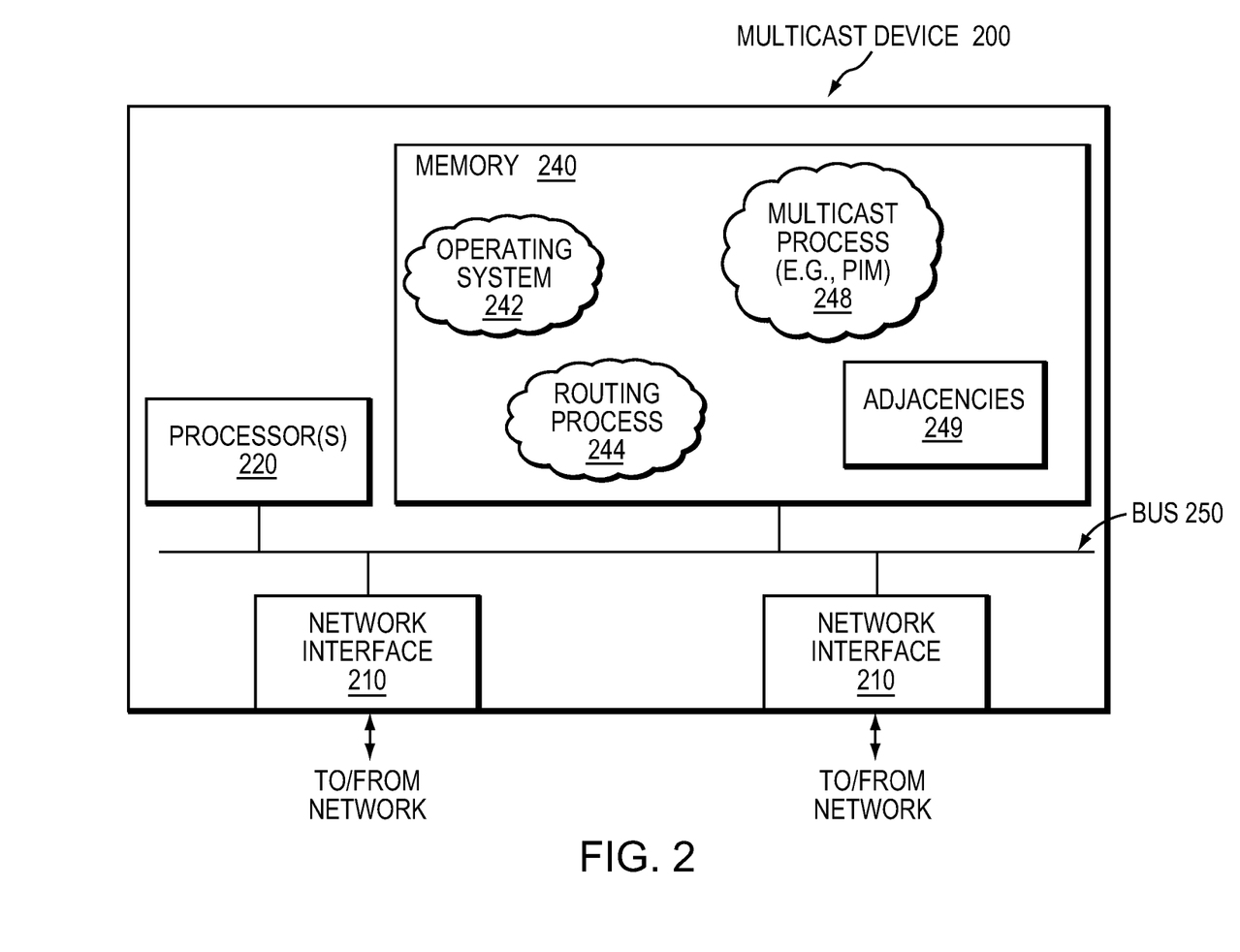
FIG. 2 illustrates an example network device/node.

FIG. 2 is a schematic block diagram of an example node/device 200 that may be used with one or more embodiments described herein, e.g., as a PE 135 (or possibly a CE 125 if aptly configured to participate in the techniques described below according to revised protocol practices). The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) or Virtual LAN (VLAN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures, such as an "adjacencies" data structure 249, as described below. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing services/process 244, and multicast services/process 248. It will be apparent to those skilled in the art that other types of processors and memory, including various computer-readable media, may be used to store and execute program instructions pertaining to the techniques described herein.

Routing services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing services 244 may also perform functions related to virtual routing protocols, such as maintaining VRF instances, or tunneling protocols, such as for Generic Route Encapsulation (GRE) or Multi-Protocol Label Switching (MPLS), etc., each as will be understood by those skilled in the art.

Multicast services/process 248 contains computer executable instructions executed by processor 220 to perform functions provided by one or more multicast protocols, such as the Protocol Independent Multicast (PIM) protocol or any of its relative protocols as mentioned herein.

Unicast data transfer (e.g., unicast forwarding) involves forwarding a data packet from a single sending process of an end node ("source") to a single receiving process of an end node ("receiver") on the computer network. Often the destination of the data packet issued by a source may be more than one, but less than all of the receivers on the network. This type of multicast data transfer (e.g., multicast forwarding) is typically employed to segregate communication between groups of receivers on the network. IP multicasting, in particular, may be used to disseminate data to a large group of receivers on the network.

To affect IP multicasting, the source generally specifies a destination IP address that is a multicast group address for the message and, as such, can only represent receivers of packets. The IPv4 (or IPv6) address range is subdivided into different prefixes, one of which is designated for use by IP multicast. Receivers typically notify their communication software of their desire to receive messages destined for the multicast group address; this is called "joining a multicast group". These receiving members then "listen" on the multicast address and, when a multicast message is received at a receiver, it delivers a copy of the message to each process that belongs to the group.

IP multicasting relies on (i) a group management protocol to establish and maintain local multicast group membership, and (ii) multicast routing protocols to route packets efficiently. The Internet Group Membership Protocol (IGMP) manages packet communication between hosts and their local multicast router, letting them join or leave groups. That is, IGMP is used to send a group membership message from a host to its directly connected ("last-hop") router, indicating that the host wants to join a group (address) as a receiver. Note that IGMP is an IPv4 group membership protocol; the conventional Multicast Listener Discovery (MLD) protocol is substantially similar to, and performs the same functions as, IGMP, but for IPv6. When group membership is established, multicast packets (identified by a multicast group address in the destination address field of an IP header) are forwarded between routers using multicast routing protocols. IGMP Version 3 (IGMPv3) adds support for "source filtering," i.e., the ability for a system to report interest in receiving packets "only" from specific source addresses (INCLUDE operation), or packets from "all but" specific source addresses (EXCLUDE operation).

Multicast routing protocols construct distribution trees through the network and direct multicast forwarding. The multicast distribution trees define the path that multicast traffic will take through the network to group members. These paths are based on source or shared multicast distribution trees. A multicast distribution tree is shared when any source (host) originating data traffic destined to a group address of a multicast group uses the same distribution tree to forward data to the receivers. In contrast, a source distribution tree is a separate, shortest path tree (SPT) built for each source originating traffic to the multicast group.

In certain IP multicast networks, a single node or router acts as a meeting place for sources and receivers of multicast data. In other words, IP multicast packets from an upstream source and join messages from downstream routers "rendezvous" at this core router, or "Rendezvous Point" (RP). An RP may be configured to know the sources (S) for all multicast groups (G) of the IP multicast network. That is, by using an RP, other routers of the IP multicast networks are not required to know the addresses of the sources or every multicast group, but instead only the address of the RP. When a router (an end point) learns that an interested receiver wishes to join a particular group, the router will attempt to join the group at the RP, not to the actual source of the content. Thus, rather than the "(S,G)" notation above, the RP model utilizes a "(*,G)" notation, in which any source (*) may be used for a given group (G), i.e., multiple sources may source multicast traffic for the same group. An announcement protocol may be used to select and announce rendezvous points to all routers in the network. However, an alternative to using an announcement protocol to automatically advertise rendezvous points to all routers in the network is to manually configure the identity of the rendezvous points on all of the routers. Examples of multicast routing protocols that use a rendezvous point include PIM-Sparse Mode (PIM-SM) and Bidirectional PIM (BIDIR-PIM) protocols. Other multicast protocols that do not require a rendezvous point include PIM dense mode (PIM-DM) and PIM source specific multicast (PIM-SSM) protocols.

IP multicast may be deployed on a computer network using a specific rendezvous point to build a shared multicast distribution tree for a multicast group falling within a destination address prefix or to build a separate SPT for each source originating traffic to the multicast group. Broadly stated, a router joins a multicast group (distribution tree) towards the rendezvous point or source. The interface on the router leading towards the rendezvous point or source is an ingress interface. Depending upon the multicast routing protocol, there is usually only one ingress interface on the router receiving multicast packets for a particular route. One or more interfaces on the router leading towards the hosts (receivers) are egress interfaces. The receivers are leaves or nodes on the distribution tree. Packets are sent from a source to the root (rendezvous point or source itself) of the distribution tree, where they are forwarded towards the branches and out to the nodes that represent the receivers. On each node, packets are received on the ingress interface towards the root of the tree and packets are forwarded out egress interfaces towards the receivers or nodes.

Specifically, a receiver may use IGMP to communicate a request to join a multicast group address to a last-hop router. In response to the request, the receiver may determine a root node of the multicast group, that is, the device responsible for sourcing traffic for the multicast group (S,G) into the network (notably, where the actual "source" of the traffic is located beyond the root node). The receiver may then communicate a "Join" message/request to its neighboring routers (neighbors) on the link towards the rendezvous point (for a shared tree) or source (for an SPT) using a multicast routing protocol, such as PIM. Based on interest in the multicast source-group (S,G) pair, multicast routers in the network may then maintain a state regarding the incoming and outgoing interfaces for each (S, G) pair. The maintained state, e.g., maintained in a multicast routing table, is used to determine which data packets are to be discarded and which are to be forwarded. Illustratively, this multicast routing table may contain, for each (S,G) pair, an address of the multicast group, an address of the corresponding source, the incoming interface, and a list of outgoing interfaces. Collectively, therefore, the routers construct a multicast distribution tree rooted at a rendezvous point or source for that group address and having a branch (link) that "pulls" packets towards the last-hop router. Note that only a single multicast router (forwarder) should forward packets for a route over a specific link of the tree.

As noted above, in a multicast environment, such as a multicast virtual private network (MVPN), protocol independent multicast (PIM) may be executed over a virtual local area network (virtual LAN or VLAN), such as a multicast distribution tree or "MDT," that connects all the provider edge devices (PEs) participating in the multicast environment. In particular, since many provider networks employ encapsulation techniques (e.g., tunnels), such as GRE, MPLS, etc., the result, in combination with multicast routing, is a collection of point-to-multipoint (P2MP) tunnels from each ingress PE, which replicates any multicast traffic to each interested egress PE of the P2MP tunnel.

According to the illustrative PIM protocol, each device/node enabled for multicast sends out periodic PIM "Hello" messages on the LAN by default to announce itself as multicast capable, often including a listing of supported attributes (e.g., for capability negotiation). Receivers in the network may then create a multicast adjacency or "neighborship" with the other multicast enabled devices on the LAN. "Join" messages are then a separate request between devices that specifically requests receipt of a particular multicast stream from a source device.

Figure 3:
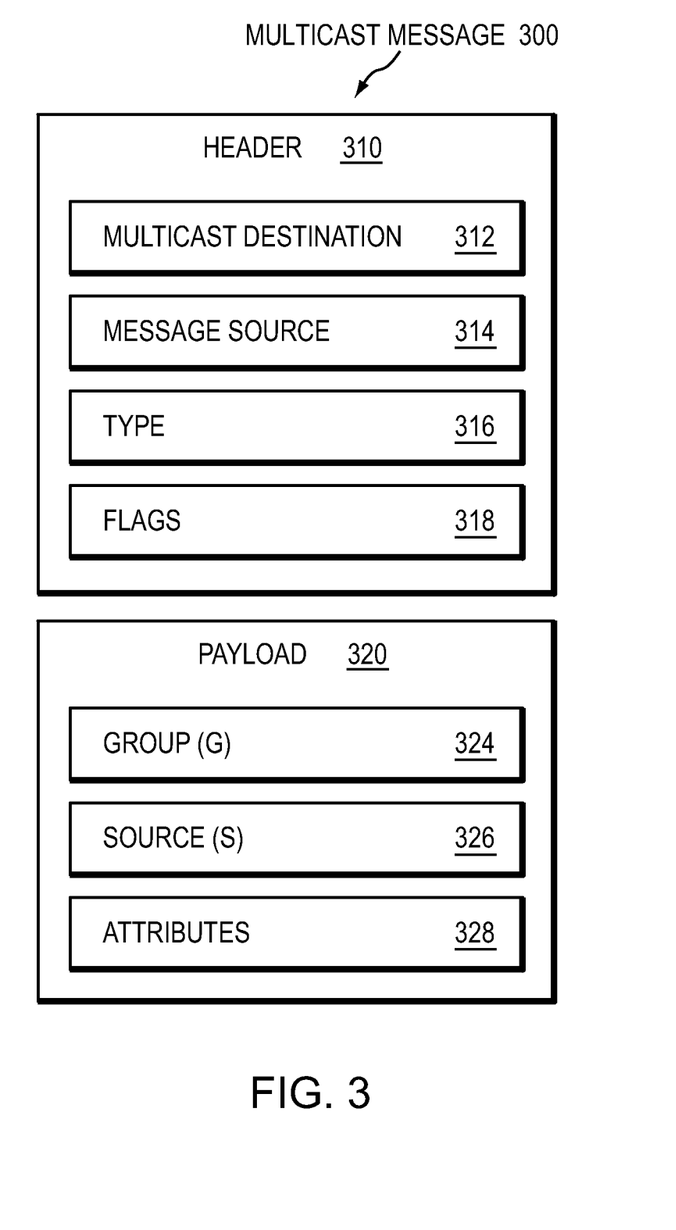
FIG. 3 illustrates an example packet/message.

FIG. 3 illustrates an example (simplified) multicast message 300 (e.g., a PIM Hello or Join/Prune) that may be transmitted on a multicast enabled LAN. For example, fields of the message 300 may comprise a header 310 and a payload 320. Illustratively, the header 310 may comprise a destination 312 of the message 300, typically a multicast address for receipt by all associated devices on the LAN, and a source address 314 of the transmitting (e.g., "interested") device. Also within the header may generally be a type field 316 to indicate whether the message is a Hello, Join, Prune, etc., along with one or more optional flags (or bits) 318 for various indicative purposes. The payload 320 may comprise, particularly for a Join/Prune request, the requested group 324 and source 326 for the associated "(S,G)" pair. Additionally, message 300 (Hellos or Joins/Prunes) may comprise a field for attributes 328, for capability negotiation as mentioned. Notably, those skilled in the art will understand that the format of the message 300 has been generalized and simplified for the purposes of illustration.

The number of devices that participate in PIM is generally equal to the number of PEs that are enabled for multicast in that multicast environment. In a rare, though possible, large multicast deployment, assuming there are 100 PEs and 50 customers (with a corresponding VPN) under the maintenance of a provider network, then each PE has nearly 5000 neighborships to maintain. Since Hello messages may be transmitted by each device once every thirty seconds (and Join messages every 60), the number of Hellos (and Joins) in the network becomes quite large. As mentioned above, while this may not be a concern for systems capable of handling the instances of such large multicast deployments with high numbers of PEs, scalability of PIM may still remain a concern for certain customers.

According to embodiments of the disclosure, therefore, the number of multicast (e.g., PIM) neighbors over a LAN may be minimized such that it is more scalable while the MVPN deployments get larger. In particular, according to the techniques described in detail below, multicast adjacencies are efficiently reduced to only those neighbors (e.g., PEs) that are utilized, such that Hello messages are only sent on demand. This is different from prior multicast (e.g., PIM) techniques, where Hello messages were transmitted on all multicast enabled ports, creating adjacencies with all possible neighboring devices. Since most often the sources (e.g., RPs) of multicast data are located in a few locations within a typical service provider network, then only a few corresponding multicast neighbors are used as a target for Join/Prune messages. The techniques herein, therefore, allow for multicast-enabled devices in a LAN to transmit Hello messages in response to receiving a Join message (e.g., having a Hello Request indication) directed to that particular device, that is, transmitting the Hello messages so long as there is interest in receiving them.

Illustratively, the techniques described herein may be performed by hardware, software, and/or firmware, such as in accordance with multicast (e.g., PIM) process 248, which may further contain computer executable instructions executed by the processor 220 to perform functions relating to the novel techniques described herein. Specifically, multicast process 248 may be configured on multicast-enabled devices to no longer send Hello messages (e.g., PIM Hellos) over a LAN interface by default, and to instead operate according to the techniques described below.

Operationally, when a particular multicast-enabled device on a LAN (e.g., a "downstream device," illustratively PE4) determines that it wants to send a Join message to an upstream multicast-enabled device that is configured to source multicast data into the LAN (e.g., an "upstream device," illustratively PE1), the downstream device may also determine whether there are any downstream multicast neighbors for the upstream device in the LAN. This may be determined based on already having an adjacency with the upstream device (thus, already being a downstream multicast neighbor), such as where other downstream devices have already indicated interest in the upstream device's multicast data, as described herein. Other methods may be used, such as monitoring for other Join messages on the LAN and/or maintaining an adjacency list 249 of other devices within the LAN.

In the event that there are no neighbors (e.g., PIM neighbors) for the upstream device PE1 yet, the interested downstream device PE4 may transmit a Join message 300 to the upstream device having a "Hello Request" indication (e.g., a bit/flag 318). The Hello Request informs the upstream device that the downstream device is interested in receiving multicast data sourced by the upstream device, and specifically requests that the upstream device transmit Hello messages onto the LAN in order to establish an appropriate adjacency or neighborship. The Join message 300 is transmitted with the multicast destination address 312 for the LAN, so it may be visible by all multicast devices on the LAN (e.g., PE1, PE2, and PE3), and is encoded with the particular multicast source address 326 (e.g., PE1). Note that current multicast protocols (e.g., PIM) do not prevent sending a Join/Prune message to an upstream device that is not yet a neighbor. In particular, the upstream device's address may be resolved via unicast routing, and is not dependent upon established adjacencies or multicast Hello messages. Thus, it is not necessary to be a neighbor with a device before sending a Join/Prune message, and devices are equally allowed to parse a Join/Prune message from a non-neighbor.

Upon receiving the Join message, the upstream router PE1 may accept the message and process it in a conventional manner (e.g., logging the requester's interest in receiving sourced multicast traffic). In addition, if the Hello Request is present, the upstream device triggers transmission of a Hello message down the LAN interface (e.g., right away), and initiates transmission of continued Hello messages. The initial triggered Hello message should then be received by all downstream devices on the LAN (e.g., PE2, PE3, and PE4, the requester), and each downstream device may then form an adjacency ("create state") for the upstream device. Accordingly, based on receipt of a Join message indicating interest, multicast neighborships (and thus Hello messages) are triggered on demand. The upstream node may continue to send out Hello messages down the LAN interface as long as there is at least one multicast forwarding state that includes this LAN interface, that is, in response to continued interest (e.g., receiving subsequent Join messages) from at least one downstream multicast-enabled device to receive Hello messages.

Subsequent Join messages from any downstream device (including the requester) need not include the Hello Request, as the upstream device is already transmitting Hello messages onto the LAN, and thus the upstream device is already known by all other devices (e.g., adjacencies have been created). Said differently, if there is at least one downstream multicast neighbor for the upstream device (e.g., a particular S,G) in the LAN, then a downstream device may simply send a Join message without the Hello Request.

Figure 4:
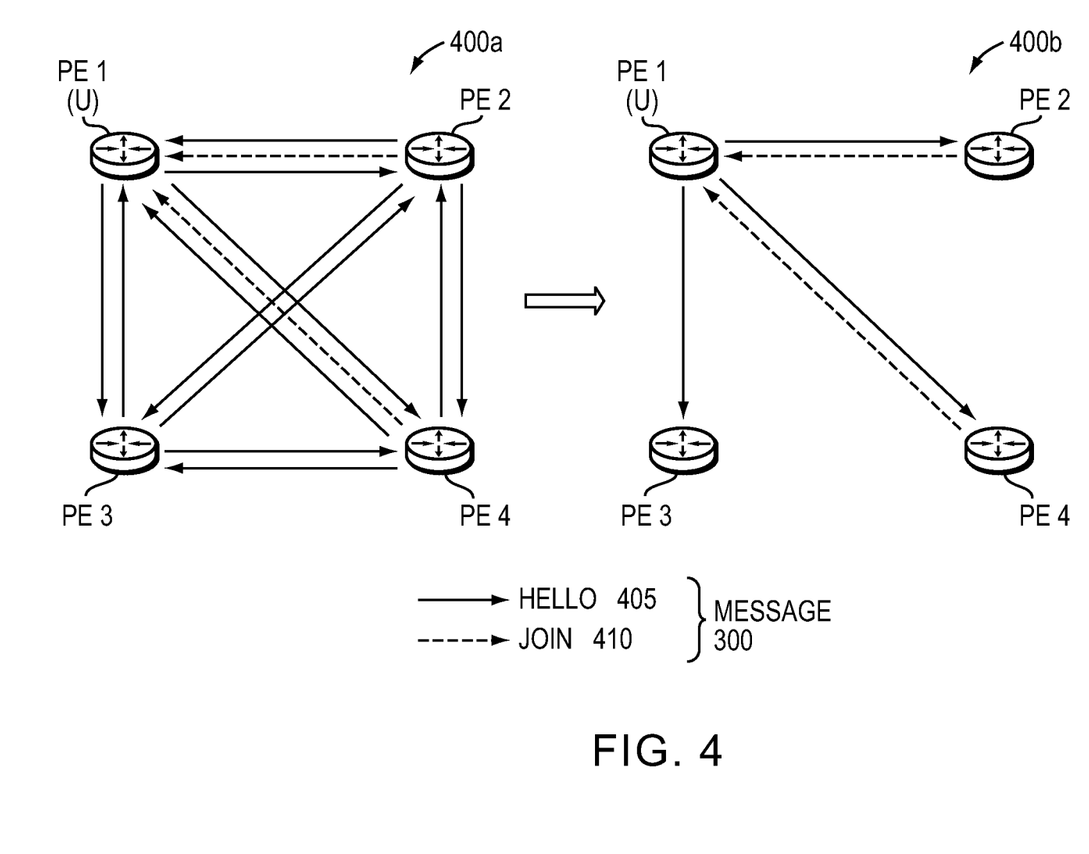
FIG. 4 illustrates an example exchange of messages.

FIG. 4 illustrates an example exchange of messages 300 as described above. For instance, exchange 400a illustrates the exchange of Hello messages 405 (a multicast message 300, shown as solid lines) between each and every multicast-enabled device (e.g., the PEs) of the network, while Join messages 410 (also a multicast message 300, shown as dashed lines) are transmitted from downstream devices PE2 and PE4 to upstream device PE1. According to the techniques herein, however, exchange 400b illustrates Join messages 410, a first of which illustratively including a Hello Request, and the resultant Hello messages 405 from the upstream device PE1 on the LAN to each downstream device regardless of their interest in receiving multicast traffic (i.e., regardless of whether they have joined the associated multicast group).

Note that due to the adjacency, the downstream devices, whether interested in multicast traffic from the upstream device or not, may also send Hello messages to the upstream device to maintain the adjacency. Alternatively, however, since the adjacency is established based on directional interest (i.e., a downstream device is interested in receiving source multicast data from an upstream device), in one or more embodiments of the disclosure, the Hello messages need only be sent from the upstream device, as shown. Moreover, in one or more embodiments, such as where the sourced multicast data is transmitted to all downstream devices, regardless of their interest, Join message suppression may be enabled, where so long as an interested downstream device (e.g., PE2) sees that at least one other downstream device (e.g., PE4) is interested in the same (S,G) multicast group from the upstream device, then that interested downstream device need not transmit Join messages.

Note also that while a "Hello Request" is generally described herein as a field or flag within a Join message that specifically requests a Hello message, in one or more embodiments of the disclosure a first Join message received at an upstream device for a particular multicast group may simply imply a Hello Request, accordingly. That is, upon receiving any Join message directed to the receiving device, that device may then begin transmission of Hello messages. Further, the Hello Request, either in this embodiment where it is not necessary, or in the embodiments above where it is used to request Hellos, may also be used as desired to specifically trigger a Hello message. For instance, since Hello messages are typically transmitted once every thirty seconds, it may be beneficial to request a more immediate response for various purposes, as opposed to waiting for the next Hello message in succession over time.

While the capabilities of the devices within a LAN (e.g., on a service provider's network 130) would be the same in most typical deployments, it is possible that there may be a conflict of supported features (attributes) between the devices. As an example of such an exceptional case, one device may support and request the use of a Reverse Path Forwarding (RPF) vector, while another device on the LAN may not. In this situation, RPF vectoring cannot be used, since not all devices necessary to implement it can support the feature.

According to one or more embodiments herein, therefore, a Join message 300 may include a set of attributes 328 of the requesting device (e.g., PE4), e.g., without knowing the capabilities of the upstream device or any other multicast device, as may normally be the case had an adjacency already existed. From the perspective of the upstream device (e.g., PE1), upon receiving a conflicting set of attributes (or attributes it is unable to understand), the upstream device may return the requested Hello message with its own set of supported attributes, thus indicating a conflict with the Join message that was sent initially, triggering a negotiation. In this situation, the requesting downstream device (PE4) may receive the Hello with the different attributes, and if in agreement, may transmit a second Join message to the upstream device that has the "downgraded" set of attributes of the Hello message to correct the conflict.

In addition to a conflict between the upstream device and the requesting downstream device, conflicts may also exist between the capabilities of other devices within the network. For instance, as noted above, some multicast (e.g., PIM) features can only be enabled if all the neighbors on the LAN support it, like the RPF vector. Since, according to one or more embodiments herein, multicast devices within the network that are not upstream devices (i.e., are receiver/downstream devices only) do not send any Hello messages by default, the requesting downstream device (e.g., PE4) may not know whether the other devices on the LAN support a particular feature/attribute. If the conflicting feature prevents other devices from parsing the Join or Prune messages, then problems in the network would arise.

In order to prevent these conflicting features from causing a problem (e.g., from being enabled), it is sufficient to be aware of at least one device in the network that does not support the particular feature, and unnecessary to know how many do not support it. According to one or more embodiments herein, when a downstream device (e.g., PE2) receives a Hello message from the upstream device (e.g., PE1), it may determine whether it supports all of the attributes in the Hello message. If there are non-supported attributes, the downstream device (PE2) may send out a new Hello message that includes the attributes that it supports. The downstream device that initially transmitted the Join message (e.g., PE4) may then learn that there is a device that does not support a particular feature, and may store the unsupported attribute information, illustratively without unnecessarily storing the actual device that cannot support the attribute. Subsequent Join messages from any downstream device on the LAN should then be transmitted without the unsupported attribute, thus removing the conflict from the multicast LAN. Alternatively, it may first be determined whether to ignore the downgraded attributes, such as local attributes that do not need full network support or otherwise, prior to actually downgrading.

Figure 5:
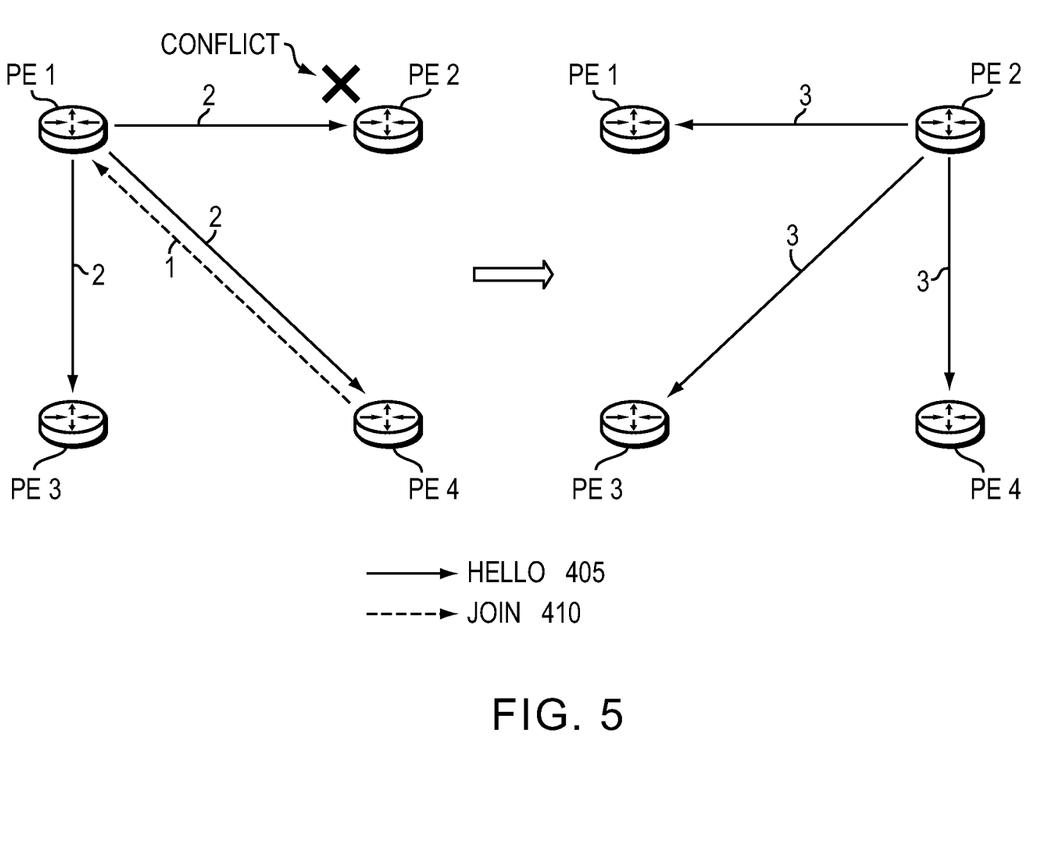
FIG. 5 illustrates another example exchange of messages.

FIG. 5 illustrates an example sequence of messages as just described. For instance, a Join message ("1") may first be sent from PE4 to the upstream device PE1, which may then respond with Hello messages ("2") on the LAN. Subsequently, a downstream device (e.g., PE2) receives the Hello message, and determines that it does not support the attributes in the Hello. As such, if necessary, the downstream device PE2 may transmit a Hello message ("3") on the LAN to indicate its non-support, effectively a request to downgrade the supported features on the LAN (e.g., for the particular multicast group or generally). Downstream devices transmitting Join messages may retransmit subsequent Join messages ("1") with the downgraded attributes, accordingly.

Notably, in the event multiple downstream devices on the LAN are unable to support a particular feature, it may be beneficial to include a back-off timer (e.g., random, on the order of seconds). In this manner, other devices that would have triggered a Hello due to unsupported attributes may wait and suppress their Hello if they receive another Hello from another node indicting that the particular option is not supported prior to expiration of the back-off timer. Moreover, the Hello message transmitted due to non-support may include an indication signifying non-support of the one or more attributes, or signifying that the Hello was triggered in response the conflicting/inconsistent attribute, and not just the supported set of attributes. In this manner, unnecessary adjacencies need not be formed between receiver devices (i.e., this Hello message is meant to relay information for conflict resolution).

Once a downstream device no longer desires to be a part of a particular multicast group, i.e., where the device is no longer configured to receive the sourced multicast data from the upstream device, it may transmit a Prune message (300, with appropriate type 316) to the upstream device. Other downstream devices may see (receive) the Prune message, and upon determining that they themselves wish to continue receiving the multicast data may ensure that a refreshing Join message is transmitted to the upstream device within a prune time-out period to override the Prune message on the LAN, since in one or more embodiments, the upstream device may not be aware of any other downstream devices that want to receive the multicast data. A refreshing Join message may simply be a conventional Join message at the periodic rate, a Join message sent in direct response to seeing a Prune message (e.g., right away, illustratively after the time-out period), a Join message identifying itself as a refreshing Join message (e.g., type 316 or flags 318), or a Join message with a new Hello Request indication. Without a refreshing Join message, e.g., within a given time-out period after receiving the Prune message, an upstream device may determine that there is no continued interest to receive Hello messages, and may cease transmission of Hello messages from the upstream device into the LAN, as well as transmission of the multicast data.

Similar to the Hello messages for conflicting attributes described above, if a downstream device sees another Join message sent to the upstream device within the time-out period, then it may suppress its own transmission of the message. In addition, such as in one or more embodiments where state is maintained regarding conflicting attributes and there were non-supported attributes, or, more particularly, if it is determined that the received Prune message was transmitted by a downstream device that indicated the non-support of the attributes, then a new Join message may be transmitted to the upstream device with an upgraded (e.g., the original) set of multicast attributes to determine whether other devices still cannot support the desired attributes. If there are other non-supporting devices, this may result in further conflict resolution, so such embodiments are optional and may be implemented as desired by system administrators. Note that the new (e.g., refreshing) Join message in this instance may include a new Hello Request indication in order to indicate re-negotiation of attributes.

Figure 6:
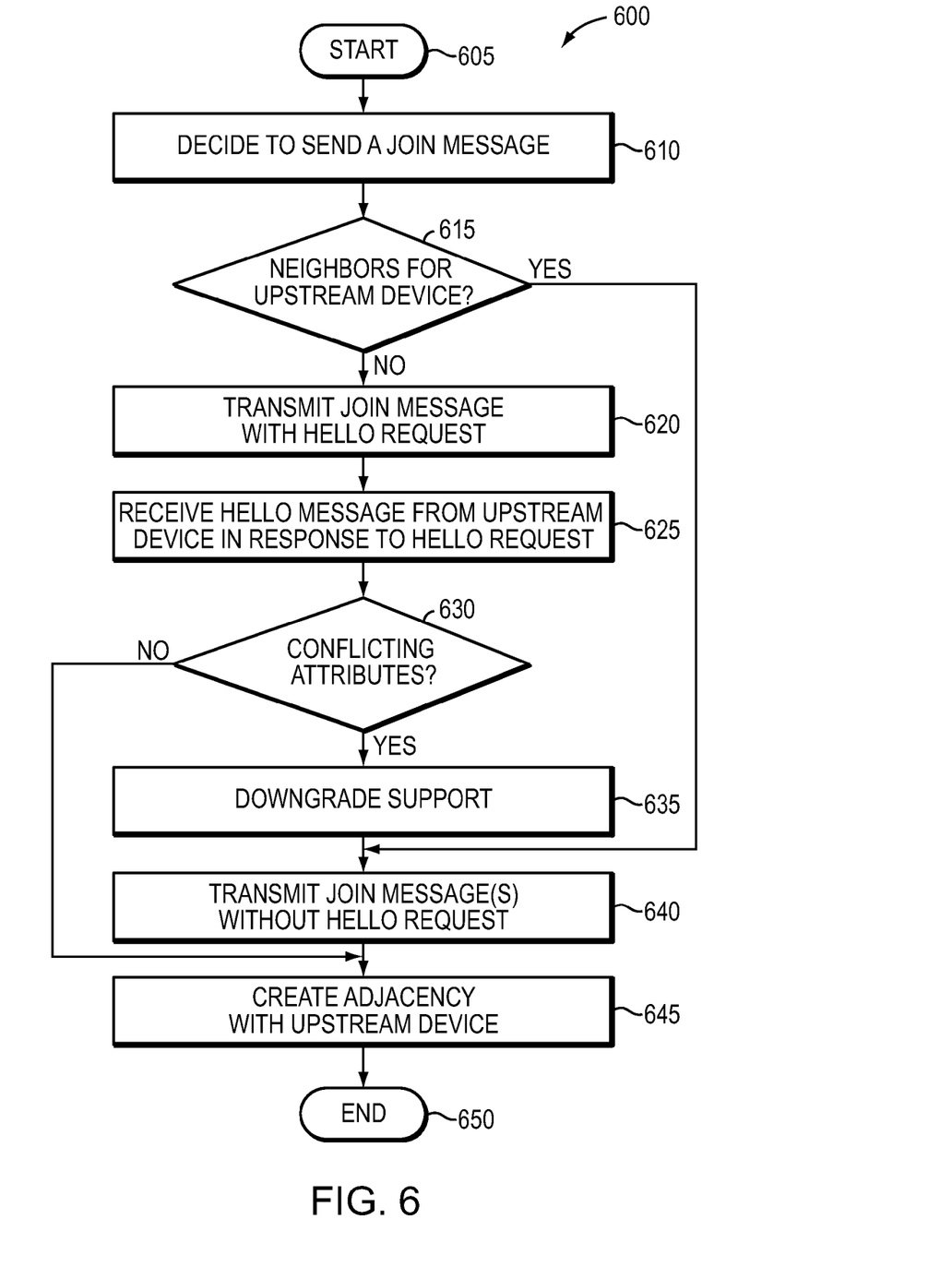
FIG. 6 illustrates an example procedure for multicast Hello on demand.

FIG. 6 illustrates a simplified example procedure for multicast Hello on demand, particularly from the perspective of a downstream device desiring to send an initial Join message in accordance with one or more embodiments described herein. The procedure 600 starts at step 605, illustratively with no devices in network 100 sending Hello messages by default, and continues to step 610, where a downstream device (e.g., PE4) decides to send a Join message 300 to an upstream device (e.g., PE1), as noted above. In step 615, the downstream device may determine whether there are any neighbors for the selected upstream device, and in response to there not being any neighbors, transmits a Join message 300 with a Hello Request indication (e.g., flags 318) in step 620, requesting that the upstream device initiate transmission of Hello messages. The downstream device in step 625 may then receive a Hello message 300 from the upstream device in response to the Hello Request. If there are conflicting attributes 328 in the returned Hello message in step 630 (that is, conflicting with attributes sent in the initial Join message), then in step 635 the joining downstream device may downgrade its multicast support, and may transmit a new Join message with the downgraded attributes in step 640, notably without a Hello Request.

Returning to step 615, in response to the upstream device already having at least one neighbor device, e.g., at least one downstream device that has already transmitted a Join message with a Hello Request to the upstream device, then the interested downstream device may simply transmit a Join message without a Hello Request in step 640. Further, in response to there being no conflict in step 630, or transmitting a Join message in step 640 (e.g., a new Join for conflicts or an initial Join without a Hello Request), the downstream device may then create an adjacency (create state) with the upstream device in step 645, and the procedure 600 ends in step 650, illustratively continuing to procedure 700 of FIG. 7 to perform further attribute conflict resolution with other devices, and/or procedure 800 of FIG. 8 to maintain the adjacency, as described below.

Figure 7:
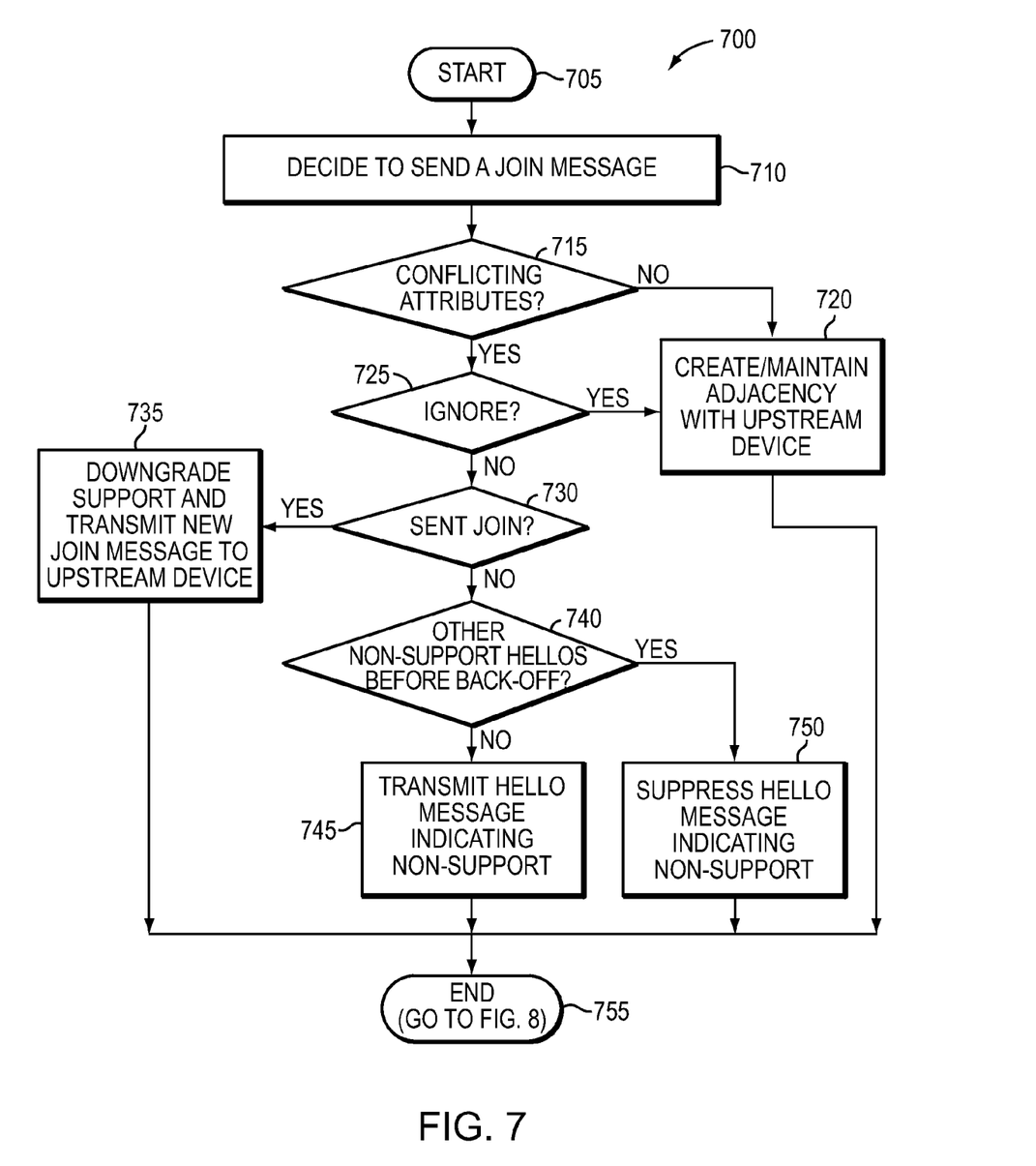
FIG. 7 illustrates another example procedure for multicast Hello on demand.

FIG. 7 illustrates another simplified example procedure for multicast Hello on demand, particularly from the perspective of a downstream device performing attribute conflict resolution, generally, in accordance with one or more embodiments described herein. The procedure 700 starts at step 705, again with illustratively no devices in network 100 sending Hello messages by default, and continues to step 710, where a downstream device, e.g., PE4, receives a Hello message from either an upstream device (e.g., PE1, overlapping relevant portions of procedure 600 above) or from another downstream device (e.g., PE2). If there are no conflicting attributes in step 715, or if there are conflicting attributes but the receiving device determines that it can ignore the conflict in step 725 (such as where the conflict involves locally relevant settings), then in step 720 an adjacency may be maintained (if already existing) or created (if necessary) by the receiving downstream device (e.g., PE4) with the upstream device.

A conflict may arise, as described above, in the event that attributes within a Hello message are different from what was expected, or different than attributes the receiving device is capable of performing or understanding. If there is a conflict that is not to be ignored in step 715 (and 725), then in step 730 the receiving device may determine a course of action based on whether it has sent a Join message to the corresponding upstream device; that is, whether it has an adjacency with the upstream device. If there is an adjacency, then in step 735 the device may downgrade its multicast support (since the received Hello's conflict in this instance is generally from a device that cannot support the attributes of the adjacency), and may transmit a new Join message having the downgraded attributes to the upstream device. Conversely, if the device does not yet have an adjacency (has not sent a Join message), then in this instance, the received Hello's conflict is generally from a device that has requested more attributes than what the receiving device is capable of performing or understanding. Accordingly, then, in step 740, the device may determine whether other devices have sent non-support Hello messages during a back-off timer (e.g., random). If not, then the receiving device may itself transmit a Hello message indicating non-support of the conflicting attributes in step 745. If there has already been such a Hello message within the back-off timer, however, then in step 750, the receiving device may suppress its Hello message to reduce traffic within the network. The procedure 700 ends in step 755, with an illustrative continuation (or parallel execution) of procedure 800 in FIG. 8, below.

Figure 8:
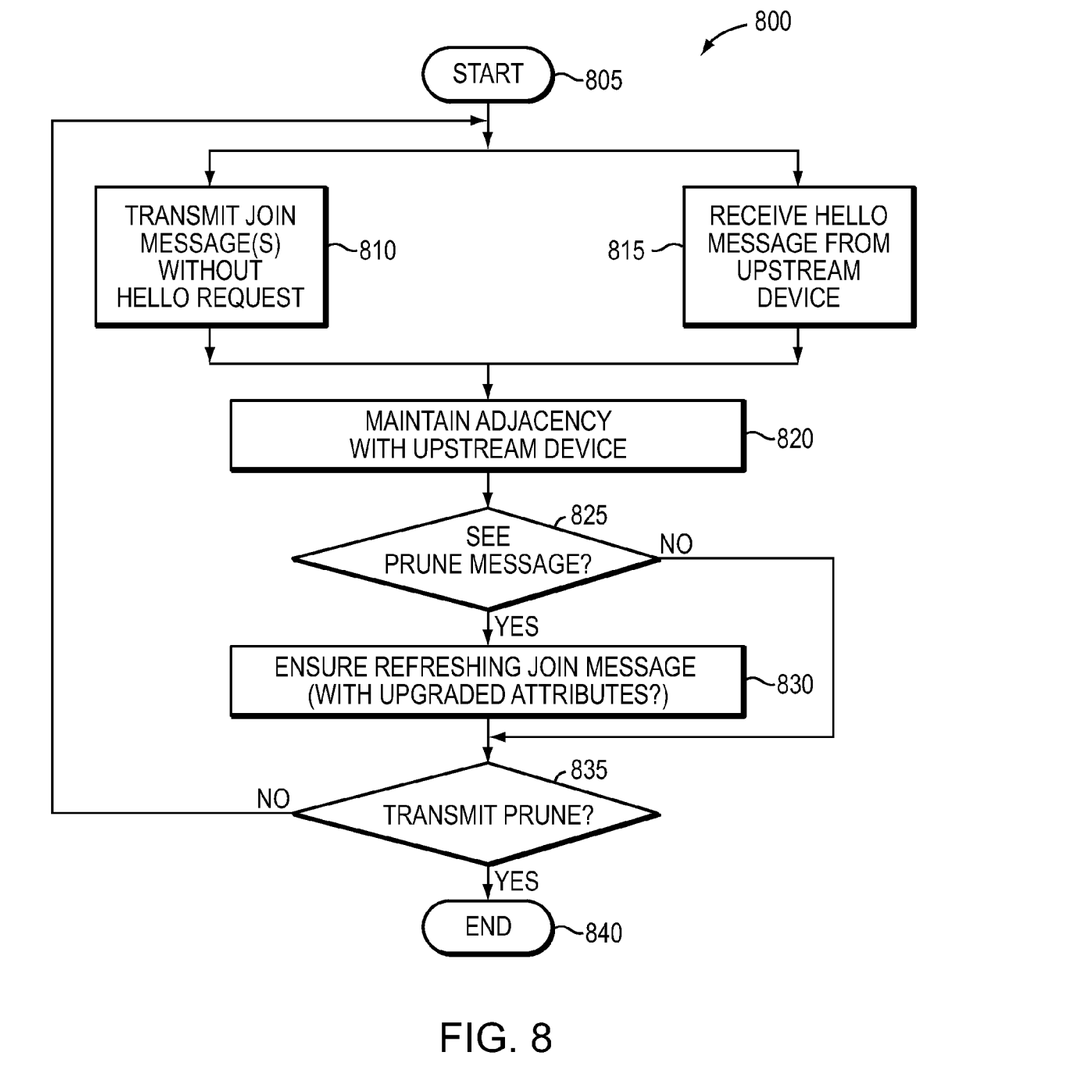
FIG. 8 illustrates another example procedure for multicast Hello on demand.

FIG. 8 illustrates another simplified example procedure for multicast Hello on demand, particularly from the perspective of a downstream device maintaining an adjacency with an upstream device in accordance with one or more embodiments described herein. The procedure 800 starts at step 805, still with illustratively no devices in network 100 sending Hello messages by default, and continues to step 810, where Join messages may be transmitted without a Hello Request to a particular upstream device, namely, after having already sent a Hello Request to that upstream device, or after determining that another downstream device has already sent a Hello Request to the upstream device (see FIG. 6). During the same time, Hello messages may also be received from the upstream device in step 815. Accordingly, in step 820, an adjacency may be maintained between the downstream device and the upstream device.

If a Prune message is detected in step 825, then the receiving downstream device in step 830 may ensure that a refreshing Join message is transmitted to the upstream device to indicate continued interest in receiving Hello messages. For instance, as described above, the receiving device may wait for a random timer to determine if other devices have sent the refreshing join, or if, upon expiration of the timer, that the device should itself send the refreshing Join message. Notably, as described above, it may be possible to attempt upgraded attributes in the refreshing Join message, such as where the pruned device was the device requesting downgraded support.

If there have been no Prune messages in step 825, and if the downstream device itself does not desire to send out a Prune message in step 835, e.g., in response to no longer being interested in receiving Hellos from the upstream device and maintaining the adjacency, then the procedure 800 continues to steps 810, 815, and 820, to maintain the adjacency. In the event, however, that the downstream device determines that it is to transmit a Prune message in step 835, then it may do so, ceasing the adjacency, and the procedure 800 ends in step 840.

Figure 9:
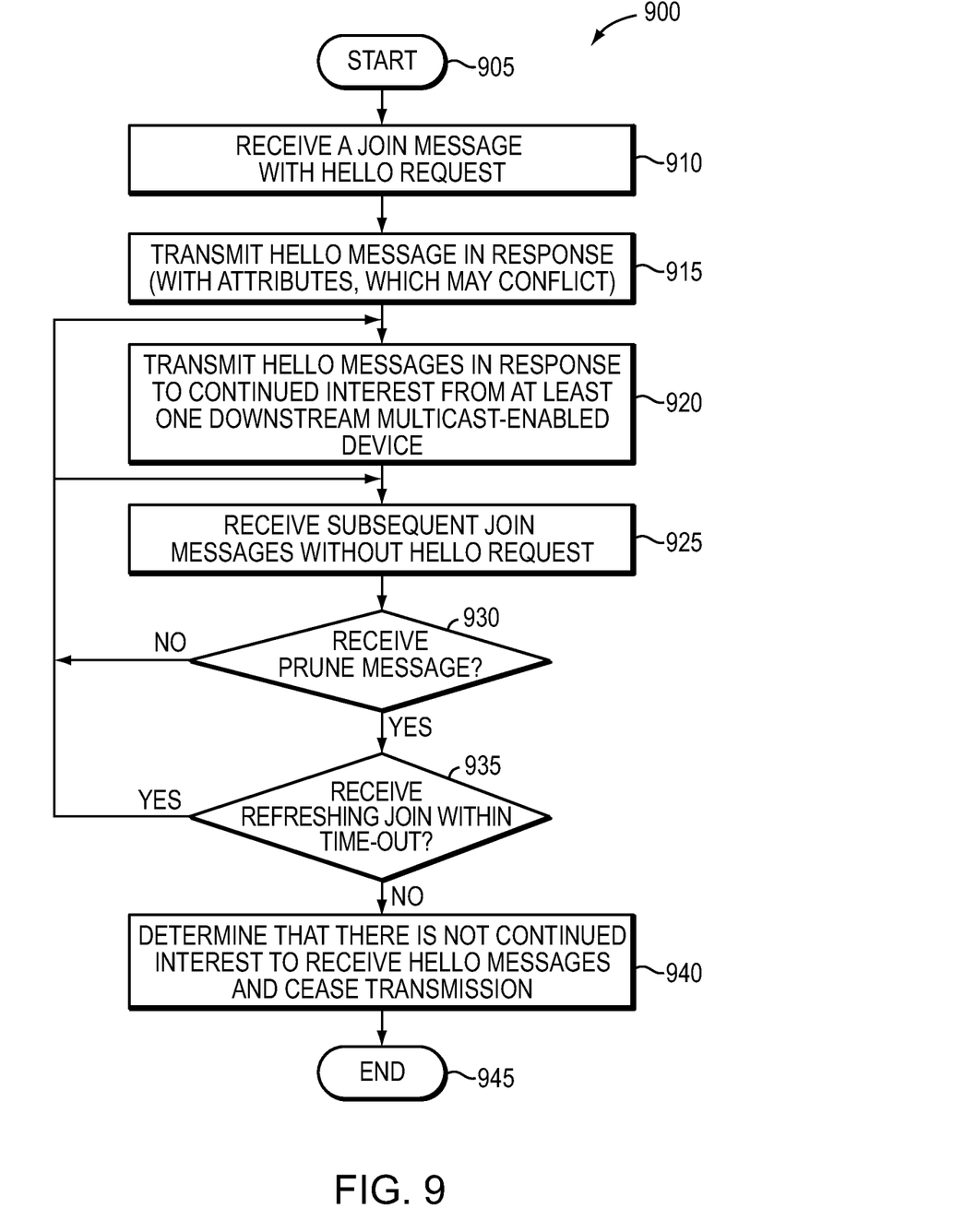
FIG. 9 illustrates another example procedure for multicast Hello on demand.

Lastly, FIG. 9 illustrates another simplified example procedure for multicast Hello on demand, but now from the perspective of an upstream device (which, as noted, may also be a downstream device to other devices in the network) in accordance with one or more embodiments described herein. The procedure 900 starts at step 905, with illustratively no devices in network 100 sending Hello messages by default, and continues to step 910, where the upstream device (e.g., PE1) may receive a Join message having a Hello Request from an interested downstream device (e.g., PE4). In response, the upstream device may transmit a Hello message in step 915 onto the LAN, as described above. Note that the Hello message may include a set of attributes, which may either match those of the initial Join request, or may conflict (e.g., a reduced capability set). Once it is determined that there is interest in receiving Hello messages based on the Hello Request, the upstream device may begin to transmit Hello messages in step 920, that is, so long as there is continued interest from at least one downstream multicast-enabled device. Generally, the continued interest is in the form of receiving subsequent Join messages (e.g., without Hello Requests) from the at least one downstream device in step 925.

So long as there are no received Prune messages in step 930, the upstream device should continue to transmit Hello messages and receive Join messages in steps 920 and 925. If, however, in step 930 the upstream device receives a Prune message, then in step 935 the upstream device may determine whether it receives a refreshing Join message within a timeout period. If there is, then the upstream device continues to transmit its Hello messages onto the LAN (e.g., at the same periodic rate, or, where a Hello Request is included within the refreshing Join message, in response to the Join message). If, on the other hand, there are no refreshing Joins in step 935, then in step 940 the upstream device may determine that there is not continued interest to receive Hello messages, and may cease transmission of Hello messages, accordingly. The procedure 900 then ends in step 945, until a new Join message (e.g., with Hello Request) is received.

The novel techniques described herein provide for on-demand multicast Hello messages (e.g., PIM Hellos) in a computer network. By using Join messages to trigger Hello messages from upstream multicast-enabled devices, the novel techniques effectively create neighbors (adjacencies) for only those devices that are forwarding multicast traffic. In particular, the techniques described above provide for multicast attribute conflict resolution, e.g., in the absence of a full neighbor/adjacency list, due to the minimized number of neighbors created over a LAN, especially where multicast sources are primarily co-located within a network. Also, the dynamic aspects of one or more embodiments described herein alleviate the need for cumbersome and inefficient manual configuration. Furthermore, the techniques above allow customers that deploy PIM-based MVPN to continue to scale the MVPN, e.g., without the need to resort to cumbersome or inefficient multicast route signaling techniques (e.g., using BGP).

While there have been shown and described illustrative embodiments that provide for on-demand multicast Hello messages in a computer network, it is to be understood that various other adaptations and modifications may be made within the spirit and scope of the embodiments herein. For example, the embodiments have been shown and described herein for specific use with PIM-based multicast networks. However, the embodiments in their broader sense are not so limited, and may, in fact, be used with other suitable multicast protocols or future versions of the PIM protocol, such as versions that no longer require Hello messages by default. In addition, while the upstream and downstream devices are shown primarily as PE devices of a provider network, this is merely an illustrative embodiment, and other types of multicast-enabled devices and multicast networks may use the techniques herein. Further, as noted above, while a "Hello Request" is generally described as a field or flag within a Join message specifically requesting a Hello message, in one or more embodiments the first Join message received at an upstream device may simply imply a Hello Request, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a particular multicast-enabled device on a local area network (LAN) in a computer network, that the particular device is to send a Join message to an upstream multicast-enabled device that is configured to source multicast data into the LAN;
   transmitting a Join message from the particular device to the upstream device on the LAN, the Join message having a Hello Request indication when there are no downstream multicast neighbors for the upstream device in the LAN, the Hello Request requesting that the upstream device transmit Hello messages onto the LAN; and
   initiating transmission of Hello messages from the particular device in response to receiving a Join message having a Hello Request indication directed to the particular device.

2. The method as in claim 1, wherein the Join message does not have the Hello Request indication when there is at least one downstream multicast neighbor.

3. The method as in claim 1, further comprising:
   receiving, by the particular device, a Hello message from the upstream device; and
   in response, creating an adjacency between the particular device and the upstream device.

4. The method as in claim 1, further comprising:
   including, within the Join message, a first set of multicast attributes;
   receiving, by the particular device, a Hello message from the upstream device, the Hello message having a second set of multicast attributes that differ from the first set of attributes; and, in response,
   transmitting a second Join message from the particular device to the upstream device, the second Join message having the second set of multicast attributes.

5. The method as in claim 1, further comprising:
   receiving, by the particular device, a first Hello message from the upstream device, the first Hello message having a first set of multicast attributes;
   determining that the particular device does not support one or more attributes of the first set of multicast attributes; and, in response,
   transmitting a second Hello message from the particular device onto the LAN indicating non-support of the one or more attributes.

6. The method as in claim 5, further comprising:
   waiting for expiration of a back-off timer prior to transmitting the second Hello message; and
   in response to receiving a third Hello message at the particular device from a downstream multicast neighbor of the upstream device that indicates non-support of the one or more attributes within the back-off timer, suppressing transmission of the second Hello message by the particular device.

7. The method as in claim 1, further comprising:
receiving, by the particular device, a first Hello message from the upstream device, the first Hello message having a first set of multicast attributes;
receiving, by the particular device, a third Hello message from a downstream multicast neighbor of the upstream device that indicates non-support of one or more attributes of the first set of multicast attributes and support of a second set of multicast attributes; and
determining whether to ignore the third Hello message.

8. The method as in claim 7, further comprising:
in response to determining not to ignore the third Hello message, downgrading support of the particular device to the second set of multicast attributes; and
transmitting a second Join message from the particular device to the upstream device, the second Join message having the second set of multicast attributes.

9. The method as in claim 1, further comprising:
transmitting a Prune message from the particular device to the upstream device in response to the particular device no longer being configured to receive the sourced multicast data from the upstream device.

10. The method as in claim 1, further comprising:
receiving a Prune message on the LAN from a downstream multicast neighbor of the upstream device that indicates that the downstream multicast neighbor is to no longer receive the sourced multicast data from the upstream device; and
in response to determining that the particular device is to still receive the sourced multicast data from the upstream device, ensuring that a refreshing Join message is transmitted to the upstream device within a prune time-out period.

11. The method as in claim 10, further comprising:
in response to seeing a refreshing Join message at the particular device from a downstream multicast neighbor of the upstream device on the LAN within the prune time-out period, suppressing transmission of the refreshing Join message by the particular device.

12. The method as in claim 10, further comprising:
determining that the received Prune message was transmitted by a downstream multicast neighbor of the upstream device that indicated non-support of one or more multicast attributes that required a downgrade from a first set of multicast attributes; and in response,
transmitting a second Join message from the particular device to the upstream device on the LAN with a second Hello Request indication and the first set of multicast attributes.

13. The method as in claim 1, wherein multicast-enabled devices in the computer network operate according to a protocol independent multicast (PIM) protocol.

14. An apparatus, comprising:
one or more network interfaces configured to communicate on a multicast-enabled local area network (LAN) in a computer network;
a processor coupled to the network interfaces and configured to execute one or more processes; and
a memory configured to store a process executable by the processor, the process when executed operable to:
determine that the apparatus is to send a Join message to an upstream multicast-enabled device that is configured to source multicast data into the LAN;
determine whether there are any downstream multicast neighbors for the upstream device in the LAN; and
transmit a Join message to the upstream device on the LAN with a Hello Request indication in response to there being no downstream multicast neighbors for the upstream device in the LAN, the Hello Request requesting that the upstream device transmit Hello messages onto the LAN.

15. The apparatus as in claim 14, wherein the process when executed is further operable to:
initiate transmission of Hello messages onto the LAN in response to receiving a Join message having a Hello Request indication directed to the apparatus.

16. The apparatus as in claim 14, wherein the process when executed is further operable to:
transmit a Join message from the particular device to the upstream device on the LAN without the Hello Request in response to there being at least one downstream multicast neighbor for the upstream device in the LAN.

17. The apparatus as in claim 14, wherein the process when executed is further operable to:
receive a first Hello message from the upstream device, the first Hello message having a first set of multicast attributes;
provide support for a second set of multicast attributes that is different from the first set of multicast attributes; and
transmit a second Join message to the upstream device, the second Join message having the second set of multicast attributes.

18. The apparatus as in claim 14, wherein the process when executed is further operable to:
receive a Prune message on the LAN from a downstream multicast neighbor of the upstream device that indicates that the downstream multicast neighbor is to no longer receive the sourced multicast data from the upstream device; and
ensure that a refreshing Join message is transmitted to the upstream device within a prune time-out period in response to determining that the apparatus is to still receive the sourced multicast data from the upstream device.

19. A method, comprising:
receiving, by an upstream multicast-enabled device on a local area network (LAN) in a computer network, a Join message having a Hello Request indication from a downstream multicast-enabled device on the LAN that is configured to receive multicast data sourced into the LAN by the upstream device;
transmitting a Hello message from the upstream device into the LAN in response to the Hello Request; and
transmitting Hello messages from the upstream device into the LAN in response to continued interest from at least one downstream multicast-enabled device to receive Hello messages.

20. The method as in claim 19, further comprising:
receiving subsequent Join messages at the upstream device that do not carry the Hello Request indication.

21. The method as in claim 19, further comprising:
determining continued interest from at least one downstream multicast-enabled device to receive Hello messages in response to receiving subsequent Join messages at the upstream device from the at least one downstream device.

22. The method as in claim 19, further comprising:
receiving a Prune message from at least one downstream device at the upstream device;

determining that there is not continued interest from any downstream device to receive Hello messages based on not having received a refreshing Join message within a given time-out period after receiving the Prune message; and ceasing transmission of Hello messages from the upstream device into the LAN in response to there being no continued interest to receive Hello messages.

23. The method as in claim 22, wherein the refreshing Join message has a Hello Request indication.

24. An apparatus, comprising:
one or more network interfaces configured to communicate on a multicast-enabled local area network (LAN) in a computer network;
a processor coupled to the network interfaces and configured to execute one or more processes; and
a memory configured to store a process executable by the processor, the process when executed operable to:
receive a Join message having a Hello Request indication from a downstream multicast-enabled device on the LAN that is configured to receive multicast data sourced into the LAN by the apparatus;
transmit a Hello message into the LAN in response to the Hello Request; and
transmit Hello messages into the LAN in response to continued interest from at least one downstream multicast-enabled device to receive Hello messages.

25. The apparatus as in claim 24, wherein the continued interest comprises received subsequent Join messages that do not carry the Hello Request indication.

* * * * *